(12) United States Patent
Turowski et al.

(10) Patent No.: US 10,954,980 B2
(45) Date of Patent: Mar. 23, 2021

(54) CONNECTION FITTING

(71) Applicant: ASS-Einrichtungssysteme GmbH, Stockheim (DE)

(72) Inventors: Kai Turowski, Telgte (DE); Lutz Kühnau, Sonneberg (DE)

(73) Assignee: ASS-EINRICHTUNGSSYSTEME GMBH, Stockheim (DE)

( * ) Notice: Subject to any disclaimer, the term of this patent is extended or adjusted under 35 U.S.C. 154(b) by 529 days.

(21) Appl. No.: 15/891,871

(22) Filed: Feb. 8, 2018

(65) Prior Publication Data

US 2018/0231042 A1 Aug. 16, 2018

(30) Foreign Application Priority Data

Feb. 13, 2017 (DE) ...................... 10 2017 102 786.6

(51) Int. Cl.
*F16B 12/20* (2006.01)
*F16B 12/46* (2006.01)
*A47F 11/02* (2006.01)

(52) U.S. Cl.
CPC .......... *F16B 12/2027* (2013.01); *A47F 11/02* (2013.01); *F16B 12/2063* (2013.01);
(Continued)

(58) Field of Classification Search
CPC .... E04B 2/7427; E04B 2/7431; E04B 2/7438; E04B 2/7442; E04B 2/7416;
(Continued)

(56) References Cited

U.S. PATENT DOCUMENTS 3,834,093 A * 9/1974 Tacke ................... E04B 2/7425
52/71
4,056,985 A * 11/1977 Worrallo ................ E05D 3/122
74/435
(Continued)

FOREIGN PATENT DOCUMENTS

CN 101126406 A 2/2008
DE 29714177 U1 1/1998
(Continued)

OTHER PUBLICATIONS

German Examination Report, dated Sep. 19, 2017, for corresponding International Application 10 2017 102 786.6 with an English translation.

*Primary Examiner* — Jonathan P Masinick
(74) *Attorney, Agent, or Firm* — Myers Wolin, LLC

(57) ABSTRACT

A connection fitting is provided for releasably attaching a first plate-shaped furniture part at a second plate-shaped furniture part. The connection fitting comprises a mounting base portion for attaching the connection fitting at one of the two furniture parts, a locking arm with a first end portion and a second end portion facing the first end portion, and a fixing means. The locking arm at the first end portion is arranged pivotably about a rotation axis (DA) at the mounting portion, and the fixing means is arranged at the second end portion of the locking arm such that it is movable in radial direction relative to the locking arm. Further, a connection fitting system with at least two connection fittings and a furniture part with a connection fitting are provided.

10 Claims, 5 Drawing Sheets

(52) U.S. Cl.
CPC ...... *F16B 12/46* (2013.01); *A47B 2230/0018* (2013.01); *A47B 2230/0062* (2013.01); *F16B 2012/2045* (2013.01)

(58) Field of Classification Search
CPC .......... E04B 2/7405; E04B 2002/7446; E04B 2002/742; E04B 2002/7418; A47F 5/10; A47F 5/105; A47F 3/004; F16B 12/2027; F16B 12/2054; F16B 12/2063; F16B 2012/2045; F16B 5/0614
See application file for complete search history.

(56) References Cited

U.S. PATENT DOCUMENTS

| | | | | | |
|---|---|---|---|---|---|
| 4,121,645 | A | * | 10/1978 | Behr | A47G 5/00 16/365 |
| 4,338,990 | A | * | 7/1982 | Blodee | A47B 47/03 160/229.1 |
| 4,444,240 | A | * | 4/1984 | Bannister | E04B 2/7431 16/354 |
| 5,881,789 | A | * | 3/1999 | Melashenko | A47D 13/063 160/135 |
| 5,966,777 | A | * | 10/1999 | Jantschek | E04B 2/7431 16/354 |
| 6,009,930 | A | * | 1/2000 | Jantschek | A47G 5/00 160/135 |
| 7,874,090 | B2 | * | 1/2011 | Flagg | G09F 15/0068 40/605 |
| 7,963,493 | B2 | * | 6/2011 | Vardaro | A47F 5/10 248/241 |
| 9,131,788 | B2 | * | 9/2015 | Lindblom | F16B 12/02 |
| 9,609,961 | B2 | * | 4/2017 | Lindblom | A47F 5/103 |
| 2006/0107606 | A1 | * | 5/2006 | Remelts | E04B 2/7425 52/204.1 |
| 2008/0178543 | A1 | * | 7/2008 | Maas | E04B 2/7427 52/234 |
| 2009/0255638 | A1 | * | 10/2009 | Hardt, II | E04B 2/7427 160/351 |
| 2010/0051211 | A1 | * | 3/2010 | Chen | E04B 2/7427 160/135 |
| 2013/0260362 | A1 | | 10/2013 | Melashenko et al. | |
| 2014/0149242 | A1 | * | 5/2014 | Turner, Jr. | A47B 55/02 705/26.1 |
| 2014/0167583 | A1 | * | 6/2014 | Chen | E06B 3/482 312/322 |
| 2015/0216330 | A1 | | 8/2015 | Lindblom | |

FOREIGN PATENT DOCUMENTS

| | | | | |
|---|---|---|---|---|
| DE | 202011101542 U1 | | 11/2012 | |
| DE | 102013012359 A1 | * | 1/2015 | ............ F16B 5/0607 |
| GB | 1484065 A | * | 8/1977 | ........... E04B 2/7405 |
| GB | 2144196 A | | 2/1985 | |
| WO | WO-2014077467 A1 | * | 5/2014 | ............... E05D 3/12 |

* cited by examiner

CONNECTION FITTING

CROSS REFERENCE TO RELATED APPLICATIONS

This application claims priority to German Application No. 10 2017 102 786.6, filed Feb. 13, 2017, the contents of which are incorporated by reference herein.

TECHNICAL FIELD

The invention relates to a connection fitting for releasably connecting plate-shaped furniture parts, as mobile screens, partition walls, and acoustic partition walls, how they are specifically used in offices, as well as a plate-shaped furniture part with a connection fitting according to the invention.

BACKGROUND

Connection fittings for connecting partition walls or movable screens are known from prior art. Thus, it is known to connect two movable screens by means of one or more angled elements to each other, as shown in FIG. 1. Hereby, two partition walls T to be connected are arranged at a certain angle φ with respect to each other. In the corner of the two partition walls, an angled element W is arranged, and the arms of the angled element W are fastened by means of fixation screws at the respective partition wall. Hereby, it is disadvantageous that the two partition walls T cannot be released from each other or connected to each other without tools. On the other hand, it is disadvantageous that the angled elements W only allow for a placement of two partition walls at a predetermined angle φ. Therefore, a variation of the angle φ is accompanied by a replacement of the angled element W.

An alternative solution from prior art provides for attaching hook-and-loop connections at the front walls of the partition walls facing each other. Then, the partition walls may be arranged at any arbitrary angle with respect to each other and connected to each other. After the connection, the angle between the two partition walls may be varied. Hereby, however, it is disadvantageous that the hook-and-loop connectors are not stable such that the angle between the two partition walls may vary inadvertently, or the connection is released inadvertently. Additional measures have to be taken so as to prevent this.

SUMMARY

Therefore, it is an object of the present invention to provide solutions, which at least partially avoid the disadvantages known from prior art, and which create a stable connection between two furniture parts, in particular, partition walls and movable screens, which may be realized and released again without tools.

This object may be solved by a connection fitting, a connection fitting system, and a furniture part with a connection fitting in accordance with this disclosure.

Accordingly, a connection fitting for releasably attaching a first plate-shaped furniture part to a second plate-shaped furniture part is provided, wherein the connection fitting comprises at least:
a mounting base portion for attaching the connection fitting at either one of the two furniture parts,
a locking arm with a first end portion and a second end portion facing the first end portion, and
a fixing means, Wherein
at the first end portion, the locking arm is arranged pivotably about a rotation axis at the mounting base portion, and
the fixing means is arranged at the second end portion of the locking arm such that it is movable in radial direction relative to the locking arm.

At the top side of the first end portion of the locking arm, a recess may be provided running coaxially with respect to the rotation axis.

The second end portion of the locking arm may comprise a through hole running parallel to the rotation axis, through which a fixing pin is guided.

It is preferable, if the through hole is an oblong hole, which is aligned preferably axially (with respect to the longitudinal axis of the locking arm), wherein the fixing means is movable in axial direction (with respect to the rotation axis) with respect to the locking arm.

Moreover, it is preferable, if the recess and the fixing pin basically have the same cross section such that a lower end portion of the fixing pin preferably may be introduced into an upper end portion of the recess positively.

The fixing pin may have an external thread and the recess may have an internal thread corresponding thereto.

Further, it may be preferable, if
a pivot is arranged at the lower side of the first end portion of the locking arm forming the rotation axis, and
the mounting base portion comprises an axis holder at the top side corresponding to the pivot, in which the pivot is arranged rotatably about its longitudinal axis and rotatable relative to the axis holder.

Moreover, it is preferable, if the axis holder is arranged in the mounting base portion and the horizontal distance between the rotation axis and the through hole is selected such that the through hole lies outside of the mounting base portion over a predetermined rotation angle or rotation angle range of the locking arm, i.e., projects over an imaginary vertical projection of the mounting base portion.

The locking arm preferably is pivotable over 180°, especially preferably over 360° about the rotation axis, wherein a recess is provided at the top side of the mounting base portion, with which the fixing pin of the fixing means may be brought into engagement at least partially.

The recess may be formed in a cover plate, which preferably may be arranged releasably at the top side of the mounting base portion.

Moreover, it is preferable, if the horizontal distance between the longitudinal axis of the through hole (of the locking arm) and the rotation axis, and the horizontal distance between the recess in the cover plate and the rotation axis are substantially equal.

Further, a connection fitting system is provided, comprising at least two connection fittings, wherein a first connection fitting may be arranged at a first plate shaped furniture part, and a second connection fitting may be arranged at a second furniture part in order to releasably connect the two furniture parts to each other.

Further, a furniture part is provided comprising a connection fitting.

BRIEF DESCRIPTION OF THE DRAWINGS

Further details and features of the invention can be derived from the following description in connection with the drawing, in which.

DETAILED DESCRIPTION

FIG. 2(a) shows a connection fitting 1 in an exploded view, and FIG. 2(v) shows the connection fitting in a perspective view.

The connection fitting 1 basically consists of three components or parts, namely, of
- a mounting base portion 10,
- a locking arm 20, and
- a fixing means 30,
- which are designed as described in the following, and which cooperate with each other.

Mounting Base Portion

The mounting base portion 10 serves for attaching the connection fitting 1 at a furniture part, in particular, at a plate-shaped furniture part, as a partition wall, a mobile screen, or an acoustic room divider like they are often used in open plan offices, but also in classrooms.

Figure 4:
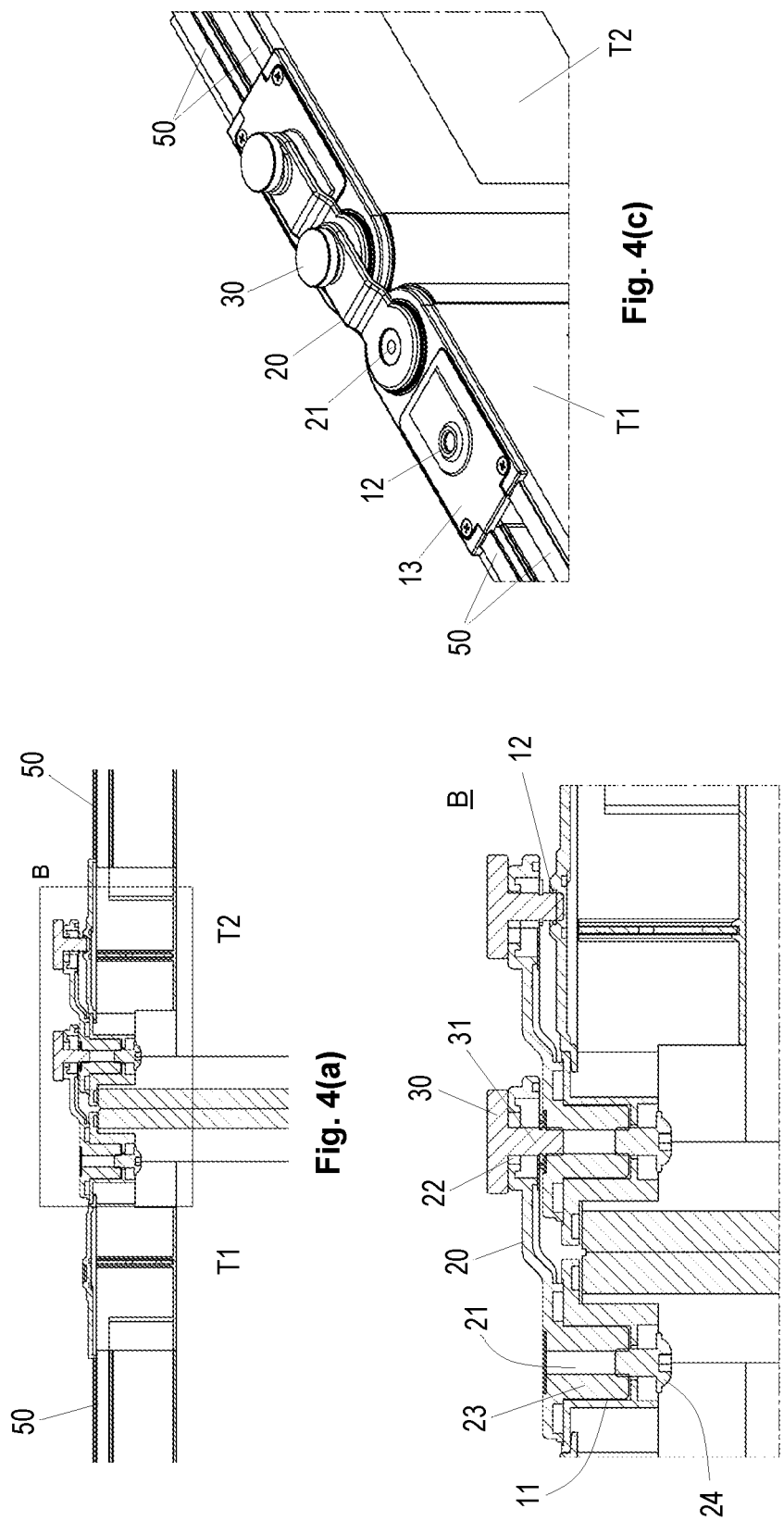
FIGS. 4(a)-(c) show two partition walls, which are connected by means of two connection fittings, wherein in FIG. 4(a), a sectional view is shown as an overview, and in the FIGS. 4(b) and (c), detailed views are shown in a sectional view and in a perspective view respectively.

With respect to the embodiment of the connection fitting 1 shown here, the mounting base portion 10 comprises a substantially cuboid housing with a longitudinal axis LA1, which at the top side has a circumferential protrusion 14. A recess corresponding to the housing of the mounting base portion 10 is provided in the furniture part, into which the housing may be inserted such that the protrusion 14 at least partially rests on the edges of the recess (as can be seen in FIG. 4(c)).

Borings are provided within the protrusion 14, which serve for receiving fixation means, as screws or nails, by means of which the mounting base portion 10 is fixed to the furniture part.

Further, the mounting base portion 10 has an axial protrusion 15. A cylindrically shaped axis holder 11 is formed within the axial protrusion 15, which is provided for receiving a pivot 23 of the locking arm 20. The axial protrusion 15 may have the shape of a sleeve, which forms the axis holder 11. The axis holder 11 runs vertically and perpendicular with respect to the longitudinal axis LA1 of the mounting base portion 10 and forms the rotation axis DA, about which the locking arm 20 is rotated or pivoted. The front end portion or the front side of the axial protrusion 15 has a semicircular cross section, the latter being advantageous, if two or more connection fittings are to be arranged at a node relative to each other, and preferably flexibly with respect to the angles between two connection fittings, as shown for example in FIG. 5.

At the top side of the housing of the mounting base portion 10, a cover plate 13 is arranged and, if needed, is fixed by means of screws to the housing.

The cover plate 13, on the one hand, serves for closing the housing.

On the other hand, the cover plate 13 is provided for arresting the locking arm 20 in a parking position. For this, the cover plate 13 has a recess 12 at the top side, with which a fixing means 30 may be engaged, if the locking arm 20 has been pivoted into the parking position.

In an alternative embodiment, the mounting base portion 10 may also be formed by a substantially flat plate having a certain strength or thickness, wherein an end portion is formed preferably substantially in a semicircular shape. Then, the axis holder 11 is provided in the end portion, which corresponds to the axial protrusion 15 of the mounting base portion 10 described above. Moreover, borings are provided in the plate, in order to attach the latter to a furniture part. Further, the plate comprises a recess 12, with which a fixing means 30 arranged at the locking arm 20 may be brought into engagement in a parking position of the locking arm 20. The embodiment of the mounting base portion 10 as a substantially flat plate has the advantage that no recess has to be provided in the furniture part, in which the housing of the mounting base portion 10 is arranged.

Locking Arm

The substantially flat locking arm 20 with a longitudinal axis LA2 consists of two portions, namely, a first or rear end portion A1 and a second or front end portion A2. With respect to the rear end portion A1, the front end portion A2 runs so as to be displaced slightly upwards such that a small step is formed between the two end portions.

In the first or rear end portion A1, a recess 21 is provided, with which a fixing means 30 of a locking arm 20 of a second or further connection fitting 1 may be engaged. Thereby, the connection fitting may be coupled to a second or further connection fitting, and the two furniture parts, on which the two connection fittings are arranged, may be connected to each other releasably.

At the lower side of the first or rear end portion A1, a cylindrically shaped pivot 23 is arranged, which is received in the axis holder 11 of the mounting base portion 10, and which thus runs coaxially with respect to the axis holder 11. The locking arm 20 may thus be rotated or pivoted about the rotation axis DA relative to the mounting base portion 10, preferably about an arbitrary rotation angle of up to 360°.

Figure 1:
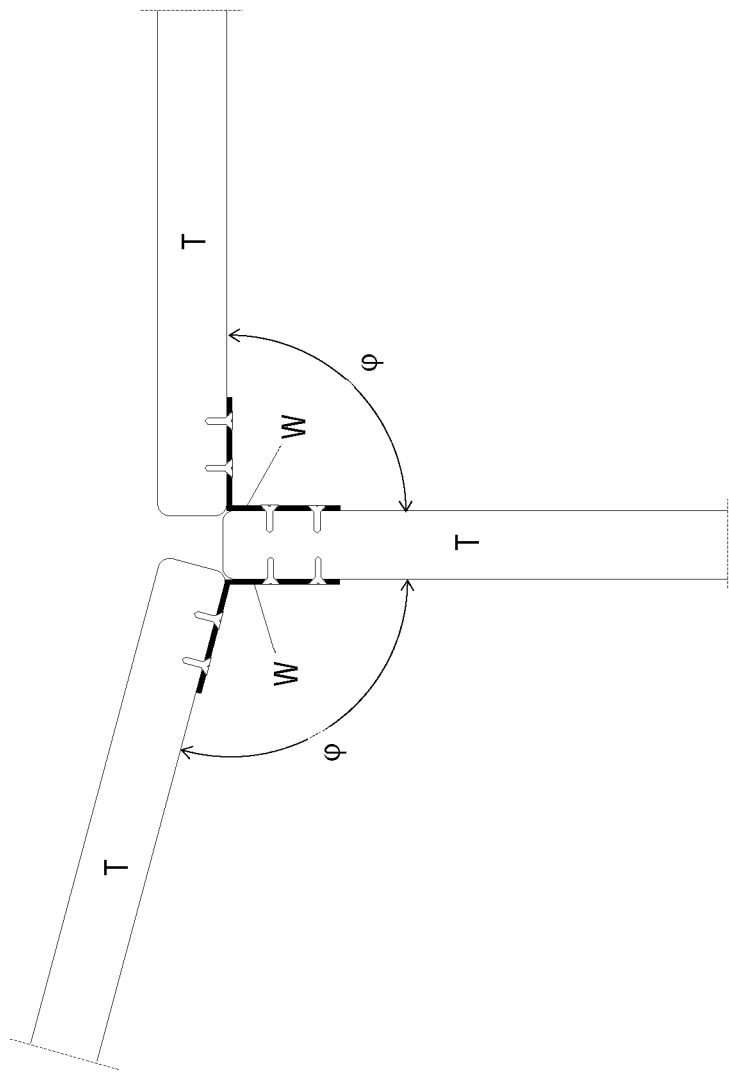
FIG. 1 shows a connection of two partition walls known from prior art.
Figure 2:
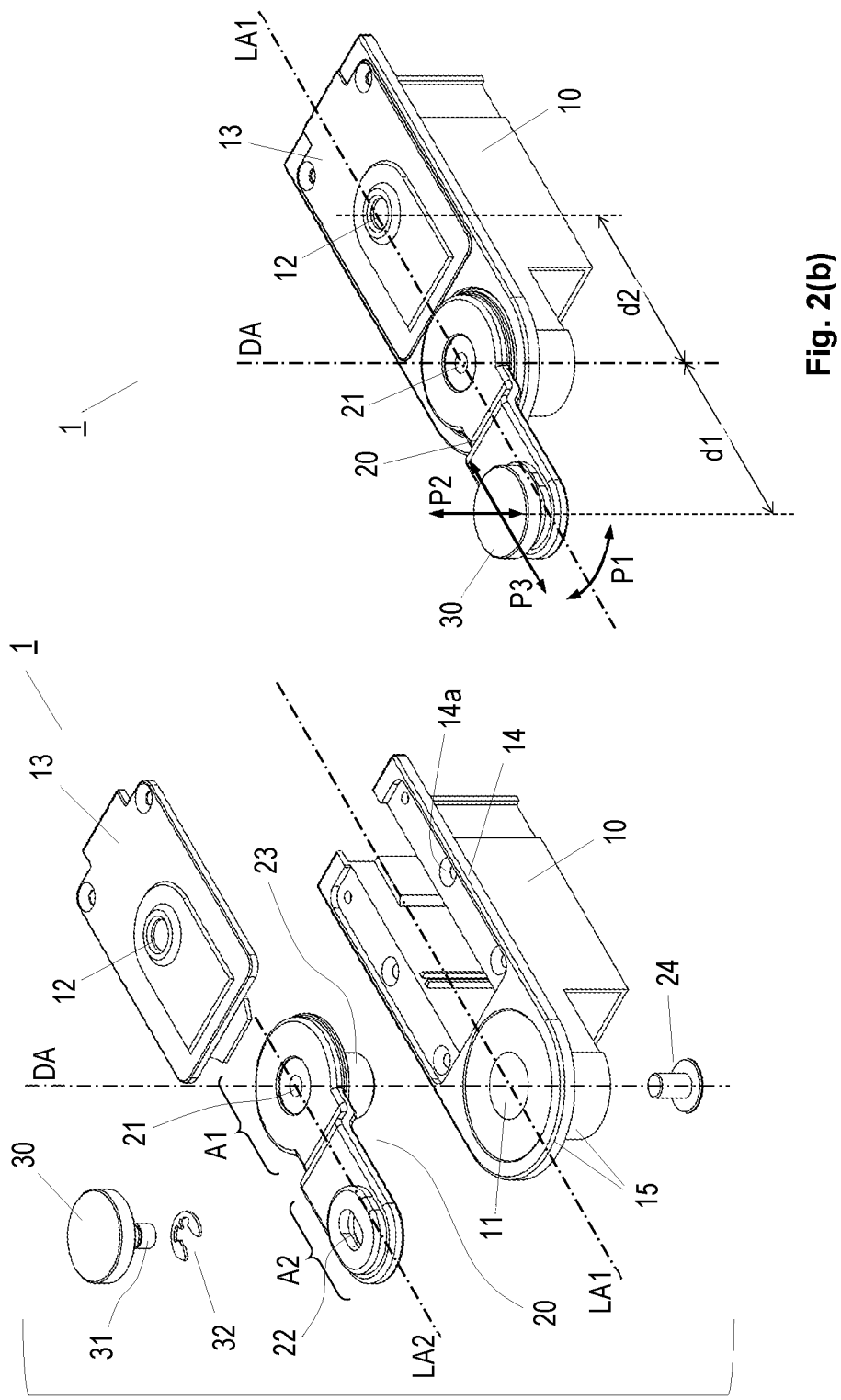
FIGS. 2(a)-(b) show a connection fitting in an exploded view and in a perspective view respectively.

With respect to the connection fitting 1 shown in figure (b) of FIG. 2, the rotation angle of the locking arm is 0°, i.e., the locking arm 20 protrudes in axial direction at the front side of the mounting base portion 10 such that the longitudinal axis LA1 of the mounting base portion 10 and the longitudinal axis LA2 of the locking arm 20 run parallel to each other. If now, the locking arm 20 is rotated about 180° in the one or the other direction about the rotation axis DA relative to the mounting base portion 10, both longitudinal axes LA1 and LA2 in turn run parallel to each other, and the locking arm 20 is in a parking position. The locking arm of the connection fitting shown in FIG. 4(b) on the right-hand side is in such a parking position.

The recess 21, which may be embodied as a blind hole or a boring with a thread also runs coaxially with respect to the axis holder 11, and thereby also coaxially with respect to the rotation axis DA.

Figure 3:
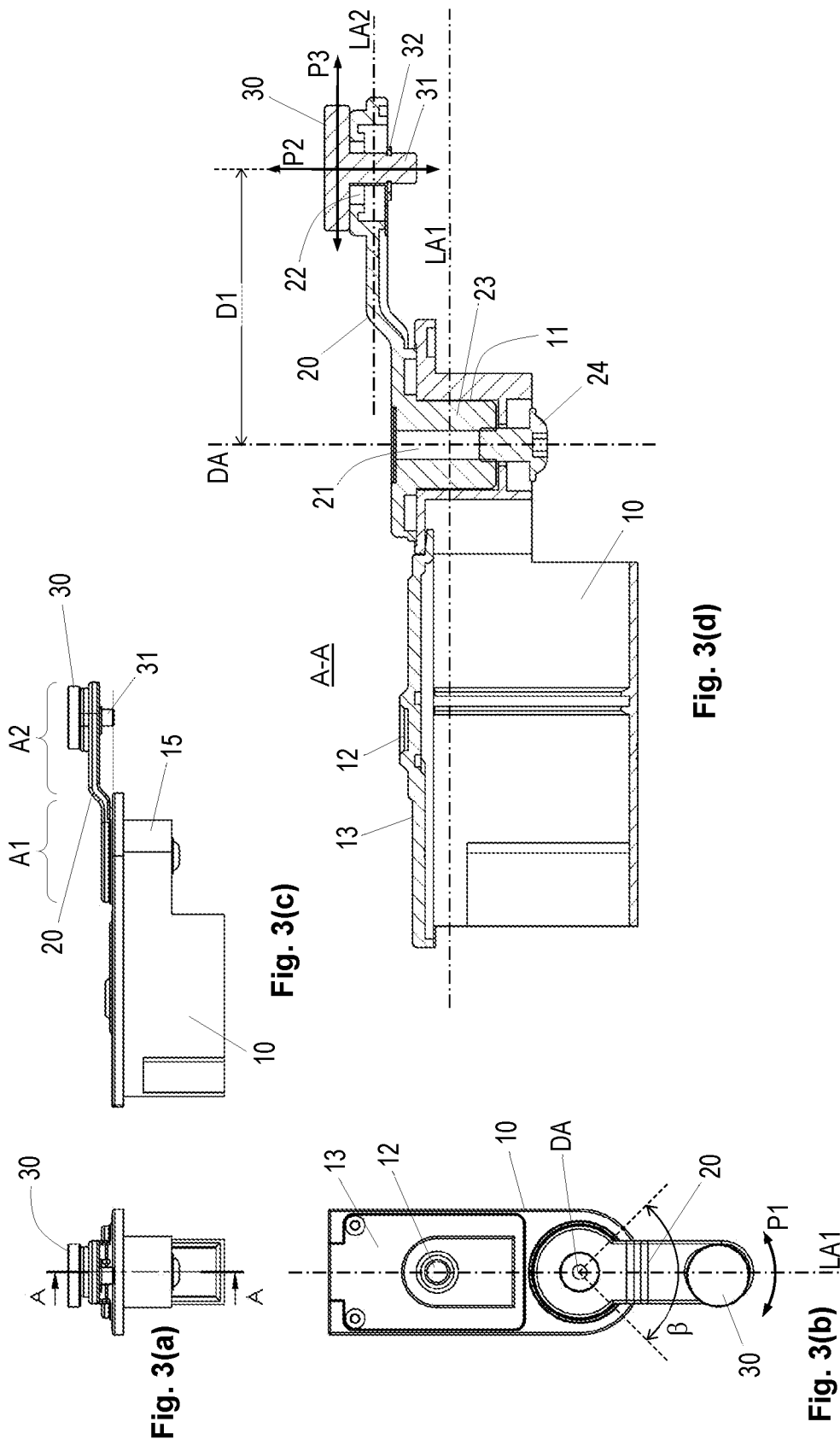
FIGS. 3(a)-(d) show the connection fitting shown in FIG. 2(a)-(b) in a front view, a top view, a side view, and a sectional view along the section axis A-A respectively.

According to an embodiment, the pivot 23 may be formed as a sleeve, which at the same time forms the rotation axis and the recess 21, as becomes apparent in FIG. 3(d).

The pivot 23 arranged within the axis holder 11 of the mounting base portion 10 may be displaceable in axial direction, i.e., along the rotation axis DA relative to the mounting base portion 10. Thereby, the locking arm 20 may be lifted easily, for example, for the purpose of rotation. It is preferable, if a stop is provided in the axis holder 11 or at the pivot 23, which prevents an (inadvertent) complete pulling out of the pivot 23 from the axis holder 11. The stop may be formed, for example, by a screw 24, which is guided from below through the bottom of the axis holder within the axis holder 11, and which is fixed there at the lower side of the pivot 23. The diameter of the hole in the bottom of the axis holder 11, hereby, is smaller than the diameter of the head of the screw 24.

According to an embodiment, a return member (not shown here), as a spring, may be arranged within the axis holder, which cooperates with the pivot 23 or with the locking arm 21, and which puts the pivot 23 into the axis holder 11. A lifting of the locking arm 20 or a pulling out of the pivot 23 from the axis holder 11 up to the stop, then, is effected against the restoring force of the return member.

In the second or front end portion A2 of the locking arm 20, a through hole 22 is arranged, with which the fixing means 30 or the fixing pin 31 of the fixing means 30 engages or is guided through.

The through hole 22, here, is formed as an axial oblong hole, thus, aligned parallel to the longitudinal axis LA2 of the locking arm. The provision of such an oblong hole has the advantage that inaccuracies during alignment of the partition walls to be connected during coupling of the connection fitting to a further connection fitting may be compensated for by means of the fixing pin 31 being suitably displaceable within the oblong hole (as indicated by the double arrow P3 in FIG. 2(b)).

The dimensions of the locking arm 20, the axial protrusion 15 of the mounting base portion 10, and the arrangement of the axis holder 11 within the mounting base portion 10 are preferably selected such that the second or front portion A2 of the locking arm 20 always projects beyond the mounting base portion 10 in an equal distance at a rotation angle of the locking arm between −90° and +90° (figure (b) of FIG. 2 shows the locking arm 20 at a rotation angle of 0°). The rotation direction of the locking arm 20 about the rotation axis DA is indicated by the double arrow P1.

Further, the horizontal distance d1 between the center of the through hole 22 and the rotation axis DA is substantially equal to the horizontal distance d2 between the rotation axis DA and the center of the recess 12. Thereby, it is ensured that the fixing means 30 may engage with the recess 12 during a rotation of the locking arm 20 about 180° (parking position).

Fixing Means

The fixing means 30, here, is formed as a knurled screw, wherein the pin or pivot 31 is guided through the through hole 22 of the locking arm 20. A retaining ring 32 may be provided at the lower side of the through hole 22, which prevents the fixing means 30 from falling out of the through hole 22.

The pin 31 of the fixing means 30 may have an external thread, whereby the recess 21 at the locking arm 20 has an internal thread corresponding thereto. Thereby, a stable connection between the connection fittings can be realized. The connection may be created and released again easily, and above all, without tools by screwing or unscrewing the fixing means 30 of a connection fitting into or from the recess 21 of the other connection fitting.

Alternatively, the pivoted 31 may also have no thread such that the pin may be simply inserted into the recess 21 or may be pulled out of the recess 21.

According to an embodiment, the fixing means 30 may be displaced vertically relative to the locking arm 20, as indicated by the double arrow P2. Thereby, horizontal differences may be compensated for to a certain extent more easily during locking or during coupling of the connection fitting to a further connection fitting.

FIGS. 3(a)-(d) show the connection fitting of FIG. 2(a)-(b), wherein in FIG. 3(a), a front view, in FIG. 3(b) a top view, in FIG. 3(c) a side view, and in FIG. 3(d) a sectional view along the section axis A-A are shown.

In FIG. 3(c) it becomes apparent that the front end portion A2 of the locking arm 20 runs slightly shifted upwards in a vertical direction with respect to the rear end portion A1 such that a small step is formed between the two end portions A1 and A2. The displacement is selected such that the latter corresponds to the lower protruding portion of the pivot 31 of the fixing means 30.

FIG. 3(b) shows that the locking arm 20 may be rotated about the rotation axis DA over an angle range β (preferably, over an angle range of 180°), and the front or second end portion A2 always protrudes completely at the mounting base portion 10 over this angle range.

FIGS. 4(a)-(c) show two partition walls T1, T2, which are connected by means of two connection fittings, wherein in FIG. 4(a), a sectional view is shown as an overview, and in the FIGS. 4(b) and (c), detailed views of FIG. 4(a) are shown in a sectional view and in a perspective view.

At the upper front side, the partition walls comprise aluminum profiles 50, which are provided for receiving the connection fittings. The profiles 50 are formed such that the mounting base portion 10 of the respective connection fitting may be brought into engagement with these profiles, and may be screwed to these profiles. As an alternative to the profiles 50, also only a simple recess may be provided at the upper front side of the respective partition wall, into which the mounting base portion 10 may be inserted.

At the first partition wall T1, a first connection fitting is arranged. At the second partition wall, a second connection fitting is arranged. The arrangement of the connection fittings at the partition walls T1, T2 respectively is selected such that the front or second end portion A2 of the respective locking arm 20 in any case completely protrudes in axial direction from the partition wall. With equal arrangement of the two connection fittings at the respective partition wall, thus, the fixing means 30 of the connection fitting of the one partition wall T1 may engage with the recess 21 of the connection fitting of the other partition wall T2, whereby the two partition walls are coupled or connected.

In FIGS. 4(a)-(c), the fixing means 30 of the connection fitting of the first partition wall T1 engages with the recess 21 of the connection fitting of the second partition wall T2. The locking arm 20 of the connection fitting of the second partition wall T2, on the contrary, is in a parking position, in which the fixing means 30 engages with the recess 12 of the connection fitting of the second partition wall T2.

In case several partition walls comprise a connection fitting respectively at both sides, several partition walls may be stringed together, and may be coupled or connected to each other via the connection fittings.

The locking arm 20 of the connection fitting of the second partition wall T2 may, however, also be screwed out from its parking position in order to couple it to a third partition wall, which also comprises a connection fitting, as a partition wall, which is arranged at a right angle with respect to the second partition wall T2.

Figure 5:
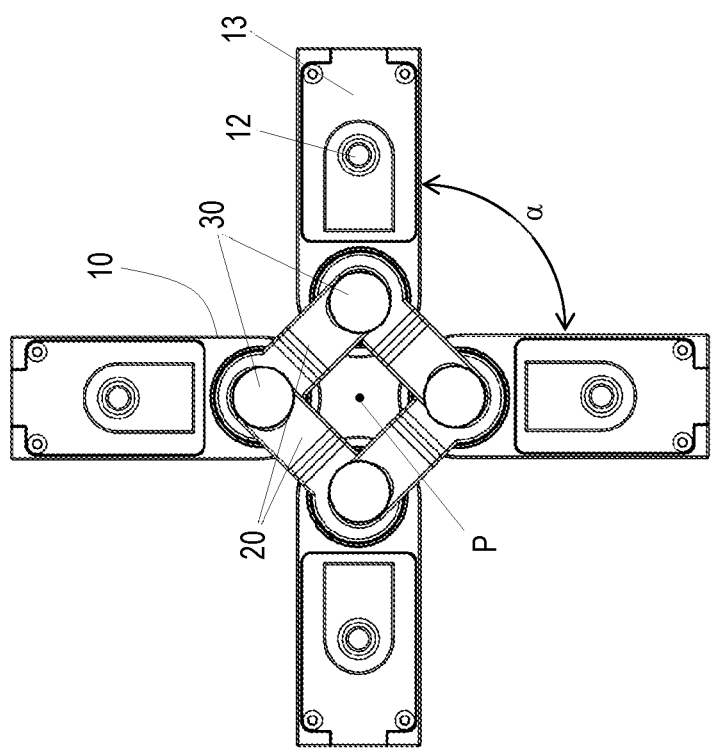
FIG. 5 shows four connection fittings, which are connected to each other such that by means of the latter, four partition walls may be connected to each other.

FIG. 5 shows four connection fittings, which are connected to each other such that for partition walls may be connected to them with respect to a node P.

The four partition walls (not shown in FIG. 5) are arranged at an angle α of 90° with respect to each other. The locking arms 20 of the four connection fittings are respectively arranged at an angle of 45° or at an angle of 135° relative to the mounting base portions 10 such that the fixing means 30 of the connection fittings respectively may engage with the recess 21 of the adjacent connection fitting.

As can be seen from FIG. 5, the setting angle α of the four partition walls may also be larger or smaller than 90°, whereby the partition walls nevertheless may be connected to each other by means of the connection fittings according.

REFERENCE NUMERALS 1 connection fitting
10 mounting base portion
11 axis holder of the mounting base portion 10
12 recess (blind hole, boring, if appropriate, threaded) at the top side of the mounting base portion 10
13 cover plate at the top side of the mounting base portion 10
14 protrusion running at least partially circumferentially
14a borings within the protrusion 14
15 axial protrusion at the mounting base portion 10
20 locking arm
21 recess (blind hole, boring, if appropriate, threaded) within the first end portion A1 of the locking arm 20
22 through hole (running parallel to the rotation axis DA and preferably being formed as an oblong hole) within the second end portion A2 of the locking arm 20
23 pivot at the lower side of the first end portion A1 of the locking arm 20
24 screw
30 locking means, e.g., a knurled screw
31 pivot of the locking means 30
32 retainer ring
50 profile (e.g., aluminum profile) at the upper front end wall of the partition walls T1, T2
d1 horizontal distance between the rotation axis DA and the through hole 22
d2 horizontal distance between the recess 12 and the rotation axis DA
A1 first end portion of the locking arm 20
A2 second end portion of the locking arm 20 (facing the first end portion A1)
LA1 longitudinal axis of the connection fitting 1 or the mounting base portion 10
LA2 longitudinal axis of the locking arm 20
P node
P1 double arrow—direction of movement (rotational movement) of the locking arm 20
P2 double arrow—direction of movement (linear movement) of the fixing means 30 radially with respect to the longitudinal axis of the locking arm 20
P3 double arrow—direction of movement (linear movement) of the fixing means 30 within the through hole 22
T partition walls
T1 first plate-shaped furniture part, e.g., a partition wall or movable screen
T2 second plate shaped furniture part, e.g., a partition wall or movable screen
W angled elements (prior art)
α setting angle between two furniture parts
β rotation angle of the locking arm
φ angle between two partition walls (prior art)

The invention claimed is:

1. A connection fitting (1) for releasably attaching a first plate-shaped furniture part (T1) at a second plate-shaped furniture part (T2), wherein the connection fitting comprises at least:
a mounting base portion (10) for attaching the connection fitting at one of the two furniture parts (T1; T2),
a locking arm (20) with a first end portion (A1) and a second end portion (A2) opposing the first end portion, and
a fixing means (30),
wherein
the locking arm (20) at the first end portion (A1) is arranged pivotably (P1) about a rotation axis (DA) at the mounting portion (10),
the fixing means (30) is arranged at the second end portion (A2) of the locking arm (20) such that it is movable in a vertical direction (P2) relative to the locking arm (20),
the locking arm (20) is pivotable (P1) about 180° about the rotation axis (DA), wherein a recess (12) is provided at a top side of the mounting base portion (10), with which a pivot (31) of the fixing means (30) can be brought into engagement at least partially.

2. The connection fitting of claim 1, wherein a recess (21) is provided at a top side of the first end portion (A1) of the locking arm (20), which runs coaxially with respect to the rotation axis (DA).

3. The connection fitting of claim 1, wherein the second end portion (A2) of the locking arm (20) comprises a through hole (22) running parallel to the rotation axis (DA), through which a pivot (31) of the fixing means (30) is guided.

4. The connection fitting of claim 3, wherein the through hole (22) is an oblong hole, which is aligned axially, wherein the fixing means (30) is movable in an axial direction (P3) relative to the locking arm (20).

5. The connection fitting of claim 1, wherein
a pivot (23) is arranged at a lower side of the first end portion (A1) of the locking arm (20), which forms the rotation axis (DA), and
the mounting base portion (10) has an axis holder (11) at a top side corresponding to the pivot (23), in which the pivot (23) is arranged rotatably.

6. The connection fitting of claim 5, wherein the axis holder (11) is arranged within the mounting base portion (10) and the horizontal distance (d1) between the rotation axis (DA) and a through hole (22) is selected such that the through hole (22) lies outside of the mounting base portion (10) over a predetermined rotation angle (β) of the locking arm (20).

7. The connection fitting of claim 1, wherein the recess (12) is formed in a cover plate (13), which can be arranged releasably at the top side of the mounting base portion (10).

8. The connection fitting of claim 1, wherein the horizontal distance (d1) between a longitudinal axis of a through hole (22) of the locking arm (20) and the rotation axis (DA), and the horizontal distance (d2) between the recess (12) in a cover plate (13) and the rotation axis (DA) substantially are of the same size.

9. A connection fitting system, comprising at least two connection fittings of claim 1, wherein a first connection fitting can be arranged at a first plate-shaped furniture part (T1), and a second connection fitting can be arranged at a second plate-shaped furniture part (T2) in order to releasably connect the two furniture parts (T1; T2) to each other.

10. A furniture part comprising a connection fitting of claim 1.

* * * * *